United States Patent

[11] 3,627,607

| [72] | Inventor | James R. Benzinger |
| | | Orchard Park, N.Y. |
| [21] | Appl. No. | 725,080 |
| [22] | Filed | Apr. 29, 1968 |
| [45] | Patented | Dec. 14, 1971 |
| [73] | Assignee | Spaulding Fibre Company, Inc. |
| | | Tonawanda, N.Y. |

[54] METHOD OF MANUFACTURING BEARING CAGE
8 Claims, 4 Drawing Figs.

[52] U.S. Cl. .................................................. 156/192,
156/184, 156/191, 156/193
[51] Int. Cl. ....................................................... B29d 31/02
[50] Field of Search ........................................... 156/90,
141, 190, 194, 192, 191, 193

[56] References Cited
UNITED STATES PATENTS

| 1,459,744 | 6/1923 | Ostrander | 156/194 |
| 1,499,781 | 7/1924 | Pilliod | 156/190 |
| 1,769,598 | 7/1930 | Neidich | 156/190 |
| 2,399,338 | 4/1946 | Ford | 156/190 |
| 2,679,968 | 6/1954 | Richter | 156/190 |
| 2,726,978 | 12/1955 | Skinner | 156/195 |
| 2,929,409 | 3/1960 | Waehner | 156/190 |
| 3,234,063 | 2/1966 | Masini | 156/190 |
| 3,242,403 | 3/1966 | Fanning | 156/190 |
| 3,293,095 | 12/1966 | Pitzer | 156/155 |
| 3,293,096 | 12/1966 | Pitzer | 156/155 |

*Primary Examiner*—Benjamin R. Padgett
*Assistant Examiner*—B. H. Hunt
*Attorney*—Bean and Bean ABSTRACT: A laminated bearing cage in which a sheet of resin impregnated material is wound upon itself about a mandrel with there being a strip of oil receptive material intercalated within the coils of the wound, resin impregnated sheet. The resin is partially cured prior to winding so as to minimize migration of resin to the oil receptive strip and final curing is effected subsequent to winding. The wound article is then immersed in lubricating oil to impregnate the oil receptive strip for metered distribution of oil therefrom.

PATENTED DEC 14 1971

3,627,607

LAYERS OF RESIN IMPREGNATED PAPER

LAYERS OF OIL IMPREGNATED PAPER

OIL RECEPTIVE PAPER (IMPREGNATED AFTER WINDING)

RESIN IMPREGNATED PAPER

INVENTOR

JAMES R. BENZINGER

BY Bean & Bean

ATTORNEYS

METHOD OF MANUFACTURING BEARING CAGE

BACKGROUND OF THE INVENTION

Various products are made by laminating paper or fibrous material which has been impregnated with various synthetic resinous materials, the synthetic resinous material being cured ultimately to form a laminate possessing high strength, high dielectric and other properties. Such laminates are used to form a variety of commercial products, and among other things laminates of this type are characterized by economy of materials and fabrication and, moreover, are adapted readily to form various shapes by relatively simple forming or machine separations. For these reasons, various attempts have been made to obtain lubricant absorption and retention properties in such laminates inasmuch as there are many instances in which products formed in the above described manner would be extremely useful in an antifriction environment if some means could be devised to impart uniform and readily duplicated lubricant absorption and retention properties thereto.

Previous attempts to obtain a laminated product as aforesaid having good lubricant absorption and retention properties have met with disfavor for one or more reasons as, for example, serious reduction in mechanical strength and concomitant reduction in machinability, or lack of uniformity in lubricant absorption and retention characteristics.

According to the present invention, the above objectives are met by providing a resin impregnated sheet intermediate the ends of which is placed a strip of oil receptive paper and then the whole is wound from one edge of the impregnated sheet upon a suitable mandrel to form a laminated cylinder in which the inner and outer layers or coils are formed by the impregnated sheet while an intermediate zone is formed by an intercalation of the oil receptive strip between adjacent coils of the impregnated sheet. The resin is partially cured before winding and is finally cured after winding, the degree of cure prior to winding being such as to minimize migration of the resin to the oil receptive strip. After being cured the cylinder is subjected to a lubricating oil environment whereby the oil receptive strip becomes impregnated with lubricating oil.

By the above procedure, the amount of lubricating oil retained can be reproduced accurately and repeatedly so that uniformity of production is assured. At the same time, the relative amount of oil retention can be controlled by controlling the width of the oil receptive strip utilized.

The above and other objects of the invention will be understood better by a reference to the accompanying drawing in which like reference numerals indicate like parts and in which.

Figure 1:
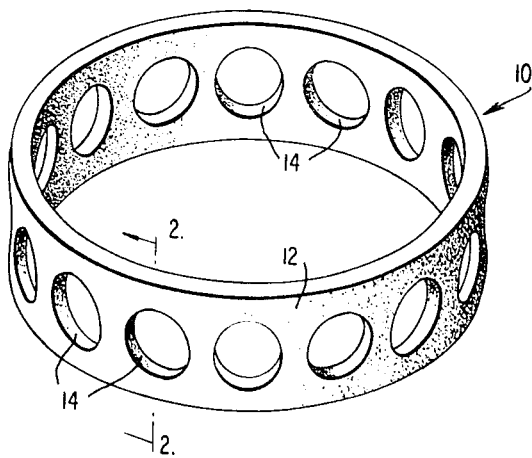
FIG. 1 is a perspective view of a ball bearing cage construction according to the present invention.

Referring first to FIG. 1, it is shown therein a ball bearing cage whose physical form is conventional as will be recognized by those skilled in the art. The cage is indicated generally by the reference character 10 and will be seen to consist of an annulus or ring 12 provided at circumferentially spaced points therearound with ball receiving openings 14.

The specific construction of the annulus 12 can be appreciated more readily by reference to FIG. 2 wherein it will be seen that the annulus bears on its inner side a plurality of inner layers 16 and on its outer side a plurality of layers 18 which are in intimate contact and which are bonded together as hereinafter more particularly described, with there being an intermediate zone in which a strip of oil retentive material 20 is sandwiched between or intercalated within the layers so as to lie between the inner and outer layers. It will be appreciated that the strip 20 contains a predetermined quantity of lubricant which, because of its disposition substantially midway between the inner and outer diameters will appropriately contact the bearing elements received within the openings 14 so as to meter lubricant to such elements during operation of the bearing assembly of which the cage 10 forms a component part.

Figure 2:
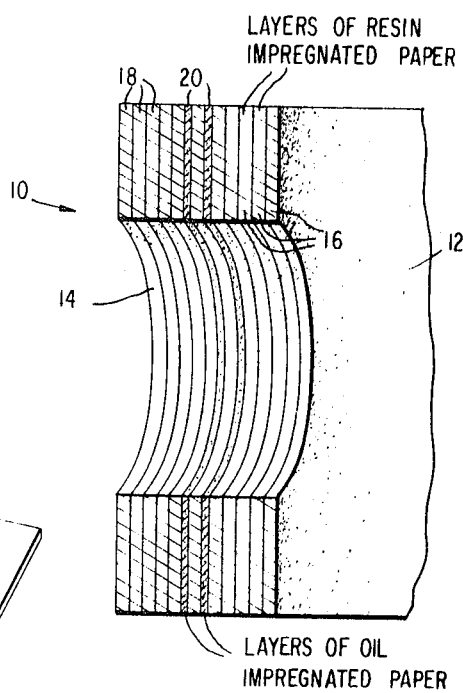
FIG. 2 is an enlarged section taken along the plane section line 2—2 in FIG. 1.
Figure 3:
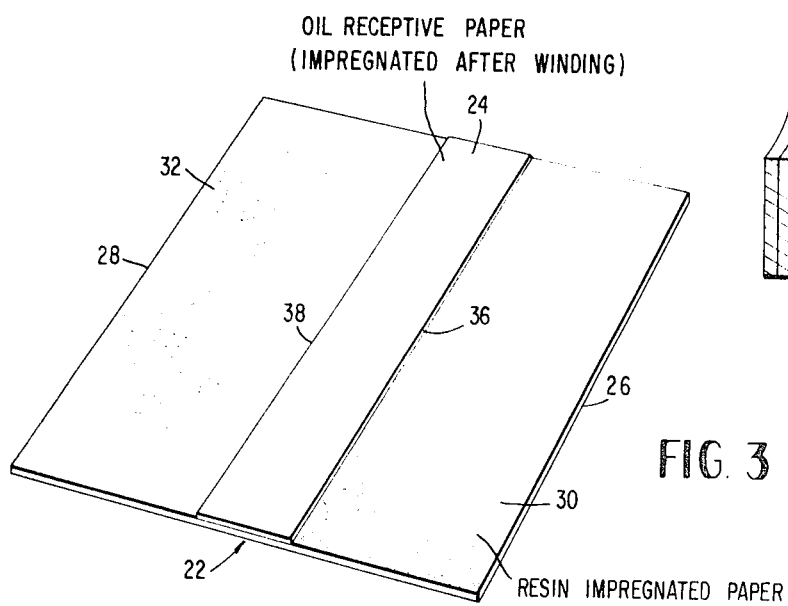
FIG. 3 is a perspective view showing the manner of laying up the impregnated sheet and the oil receptive strip.
Figure 4:
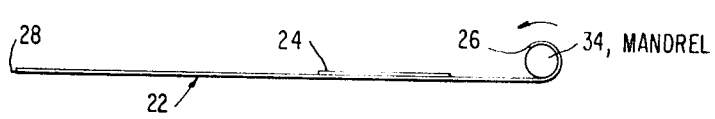
FIG. 4 is a somewhat diagrammatic view illustrating the winding process.

The manner of forming the laminated construction described in conjunction with FIG. 2 can be appreciated from a study of FIGS. 3 and 4.

With reference to FIG. 3, there is provided a sheet 22 of resin impregnated material across which is placed a strip 24 of oil receptive paper. The strip 24 is placed parallel to but spaced between the opposite edges 26 and 28 of the sheet 22 so that subsequent winding of the assemblage from the edge 26 will cause the portion 30 of the sheet (see FIG. 3) to form the inner layers 16 of FIG. 2 whereas the portion 32 of the sheet will form the outer layers 18. The winding process may take place on a suitable mandrel 34 as is diagrammatically illustrated in FIG. 4. After the winding operation and either prior to or after desired machining or forming operations, and subsequent to final curing of the blank, the article is placed in a lubricating oil environment so that the strip 24 becomes impregnated with lubricating oil. In order to retain the oil receptive properties of the strip 24, the stage of curing of the resin in the sheet 22 is well advanced, thereby to minimize migration of the resin to the oil receptive strip 24.

By way of specific example, bearing cages may be constructed in the following fashion:

EXAMPLE I

A sheet 22 of rag paper having a thickness of 0.0275 inch and having a width between its edges 26 and 28 of 50 inches was impregnated with a non oil absorptive phenolic resin cured to stage B. The degree of B stage curing is determined by plying up a 2 inch disc of resin impregnated material of approximately 3 grams weight and subjecting it to a curing temperature of 325° F. and a pressure of 1,000 p.s.i. for 5 minutes, the impregnating resin and material being in weight ratio of 115/100. The flashed resin is removed from the edge of the sample and its weight determined as a percentage of the weight of the remaining resin plus material. This percentage is termed the "greenness". Using this method, the greenness should lie between about 9 percent to about 17 percent.

A strip 24 of nonsaturating high density 100 percent new white rag paper such as Crane's 3,8 mil Dalton Roll Bond Substand 20 smooth white paper and having a width between its edges 36 and 38 of 4 ½ was placed on the sheet 22 with the spacing between the edges 26 and 26 being 20 9/32 inch. It will be noted that the distance between edges 26 and 36 is slightly less than the distance between edges 28 and 38 so that in the winding process, the strip 24 will be centered between the inner and outer diameters.

The strip 24 may be held in place by suitable pressure sensitive adhesive strips. The composite was then rolled or wound starting from the edge 26 on a 5/16 inch mandrel. The composite was rolled against a hot plate having a temperature of about 190° F. and subsequent to rolling the tube was baked for 18 hours at 225°–250° F. to effect final cure.

The tube was then machined to provide bearing cages or retainers having the dimensions 0.383 inch ×0.476 inch ×0.166 inch and then these retainers were extracted for 3 hours in filtered Freon TF using a Soxhlet extractor or the equivalent. The Freon was cycled at least once every 2 minutes. The retainers were then baked in a vacuum oven for 18 hours at approximately 200° F. under a vacuum of 28 inch of mercury. The retainers were then cooled in a conventional desiccator for 20 minutes and then placed in a container with just enough Teresso V–78 oil to cover them completely but by no more than ⅛ inch thereabove. The oil was filtered at 190° F. through a Buchner medium fitted glass filter, under vacuum.

No copper or lead in any form should be permitted in the oil. The emmersed retainers were then placed in a vacuum chamber under a pressure of 20 microns of mercury which was consistently maintained for 1 hour. The pressure in the vacuum chamber was then permitted to increase to atmospheric pressure and the retainers were then permitted to soak in the oil for an additional 15 minutes under atmospheric conditions. The retainers were then removed from the oil and centrifuged at 400 G's for 15 minutes.

Retainers formed in accordance with the above consistently show an oil retention of about 9.06 percent by weight. By the simple expedient of using a strip 24 having a 3 ½ inch width and positioned with its center on the sheet 22 identically as above, the retainers can reproducably and consistently show an oil absorption level of about 7 percent by weight, strips 2 ½ wide show an oil absorption level of about 5 ½ percent, strips 1 ½ inch wide show an oil absorption level of about 4 ½ percent, strips ½ inch wide show an oil absorption level of about 2 percent.

By following the above procedure, the amount of oil retained can both be tailored to suit a particular need and may be consistently reproduced for production purposes.

Obviously many modifications and variations of the present invention are possible in the light of the above teachings. It is therefore to be understood that within the scope of the appended claims the invention may be practiced otherwise than as specifically described.

What is claimed is:

1. The method of making blanks for bearing cages, which comprises:

impregnating a sheet of fibrous material with a thermosetting synthetic resin, the sheet having a predetermined width between side edges thereof, partially curing the impregnated sheet, placing a strip of oil receptive material substantially centrally between the widthwise side edges of the sheet, the strip having a width substantially less than the width of the sheet, forming a tube by winding the sheet from one side edge thereof to intercalate said strip between adjacent coils of the sheet, and then completing the cure of the synthetic resin.

2. The method according to claim 1 including the steps of forming a bearing cage from the tubular blank, and then impregnating the intercalated strip material with lubricating oil.

3. The method of making a bearing cage which comprises the steps of:

a. providing a sheet of fibrous material having a predetermined width between opposite side edges thereof;
   b. impregnating said sheet with thermosetting synthetic resin;
   c. partially curing the resin in the impregnated sheet;
   d. providing a strip of oil receptive sheet material having a width substantially less than said predetermined width of said sheet;
   e. placing said strip on said sheet generally parallel to said opposite side edges and substantially centrally therebetween;
   f. winding said sheet with said strip thereon starting from one side edge of said sheet to form a tube;
   g. completing the cure of said synthetic resin; and
   h. forming a bearing cage from the tube; the partial curing of step (c) being sufficient to minimize migration of the partially cured synthetic resin to the oil receptive strip.

4. The method according to claim 3 including the step of impregnating said oil receptive strip with oil.

5. The method according to claim 4 wherein the oil impregnating step is effected between steps (g) and (h).

6. The method according to claim 4 wherein the oil impregnating step is effected after step (h).

7. The method according to claim 3 wherein said thermosetting synthetic resin is a phenolic resin.

8. The method according to claim 7 wherein the winding of step (f) is performed on a mandrel by rolling against a heated plate.

* * * * *